United States Patent [19]

Itaya et al.

[11] 3,716,558
[45] Feb. 13, 1973

[54] 5-PROPARGYL THENYL ALCOHOLS

[75] Inventors: Nobushige Itaya, Minoo-shi; Toshio Mizutani, Hirakata-shi, both of Japan

[73] Assignee: Sumitomo Chemical Company Ltd., Osaka, Japan

[22] Filed: April 23, 1970

[21] Appl. No.: 31,368

[30] Foreign Application Priority Data

May 14, 1969 Japan..................................44/37203

[52] U.S. Cl..................260/332.3 R, 260/332.2 R, 260/332.2 A, 260/332.3 C, 260/340.7, 260/340.9, 424/275
[51] Int. Cl..............................................C07d 63/12
[58] Field of Search.....260/332.3 R, 347.4, 332.2 R, 260/468 P

[56] References Cited

UNITED STATES PATENTS 3,515,730 6/1970 Matsui et al.......................260/332.2
3,519,649 7/1970 Ueda et al.........................260/332.2
3,567,740 3/1971 Matsui et al......................260/347.4

OTHER PUBLICATIONS

Bohlmann, et al., Chem. Abs. 63:13208-9 (11-1965).
Morrison, et al., Org. Chem. (Allyn & Bacon, Boston, 1959), p. 634-5.

Primary Examiner—Henry B. Jiles
Assistant Examiner—Cecilia M. S. Jaisle
Attorney—Stevens, Davis, Miller & Mosher

[57] ABSTRACT

5-Propargyl thenyl alcohol having the formula,

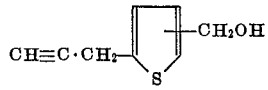

which may be useful as an intermediate for the production of pyrethroidal insecticides such as 5-propargyl-thenyl chrysanthemates.

1 Claim, No Drawings

5-PROPARGYL THENYL ALCOHOLS

The present invention relates to a novel 5-propargyl thenyl alcohol and a process for the production thereof.

More particularly, this invention relates to a novel 5-propargyl alcohol having the formula,

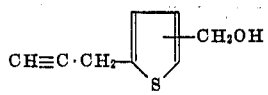
(I)

and a process for the production thereof.

The thenyl alcohols of the formula (I) are obtained through the following synthesis course:

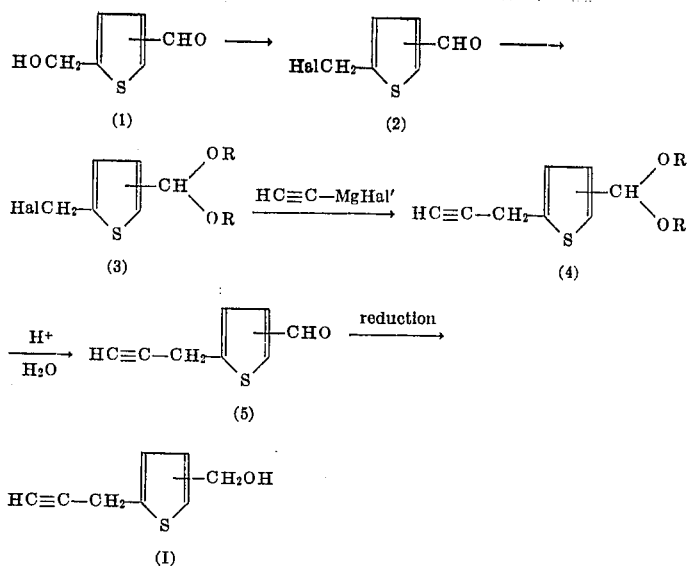

wherein Hal and Hal' are halogen atoms, and R is a lower alkyl group or the two R's may be bonded together to form a lower alkylene group.

When the thenyl alcohols are subjected to esterification reaction with the acid components of so-called pyrethroids (homologs of pyrethrin), such as chrysanthemic acid and the like, there may be obtained synthetic pyrethroids which have such a marked insecticidal effects that several times the effects of the conventional pyrethrin and allethrin are shown when applied to mosquitoes and houseflies.

The synthetic pyrethroids are examplified as follows;

| Compound No. | Structure |
|---|---|

1. 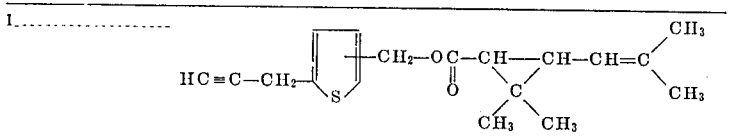

5-propargyl-2-thenyl chrysanthemate, $n_D^{25}$ 1.5292.

2. 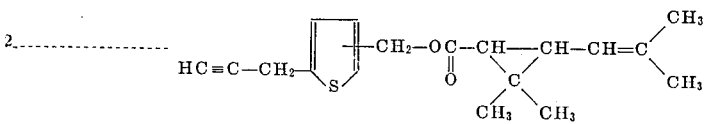

5-propargyl-3-thenyl chrysanthemate, $n_D^{25}$ 1.5264.

3. 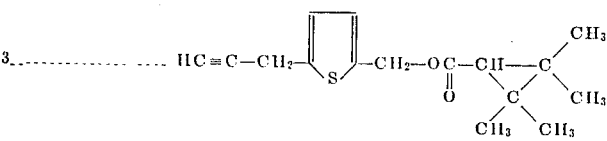

5'-propargyl-2'-thenyl 2,2,3,3-tetramethylcyclopropane-carboxylate, $n_D^{25}$ 1.5249.

5'-Propargyl-2'-thenyl 2,2,3,3-tetramethyl-cyclopropanecarboxylate, $n^{25}_D$ 1.5249.

(4)

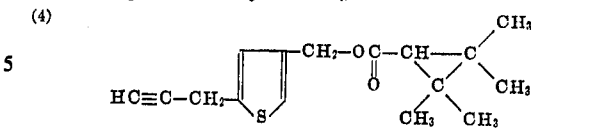

5'-Propargyl-3'-thenyl 2,2,3,3-tetramethyl-cyclopropanecarboxylate, $n^{25}_D$ 1.5220.

(5)

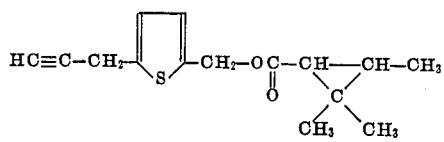

5'-Propargyl-2-thenyl 2,2,3-trimethyl-cyclopropanecarboxylate, $n^{25}_D$ 1.5256.

(6)

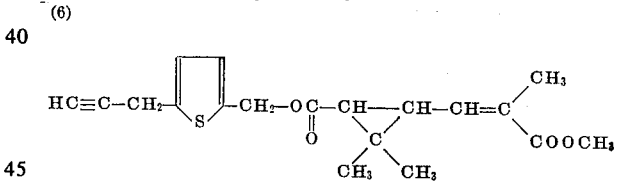

5-Propargyl-2-thienyl pyrethrate, $n^{25}_D$ 1.5411.

These esters have excellent insecticidal effects as shown in the following Test Example.

TEST EXAMPLE

Five ml. of each of the oil solutions was sprayed, using the Campbel's turn table apparatus [Soap and Sanitary Chemicals, Vol. 14, No. 6, 119 (1938)]When 20 seconds had elapsed from the spraying, the shutter was opened and housefly adults (about 100 flies per group) were exposed to the settling mist for 10 minutes and were then transferred to an observation cage. In the cage, the flies were fed and were allowed to stand one day at room temperature. Thereafter, the number of killed flies were counted to calculate the mortality thereof.

The results are shown in the following Table.

TABLE

| Composition | Mortality (%) |
| --- | --- |
| Oil Solution containing 0.05% of the compound (1) | 90 |
| Oil Solution containing 0.05% of the compound (6) | 84 |
| Oil solution containing 0.1% of the compound (2) | 85 |
| Oil solution containing 0.1% of the compound (3) | 82 |
| Oil solution containing 0.1% of the compound (4) | 90 |
| Oil solution containing 0.1% of the compound (5) | 80 |
| Oil solution containing 0.05% of the compound (1) and 0.2% of NIA-16388 | 100 |
| Oil solution containing 0.05% of the compound (2) and 0.2% of NIA-16388 | 90 |
| Oil solution containing 0.05% of the compound (4) and 0.2% of NIA-16388 | 98 |
| Oil solution containing 0.05% of the compound (5) and 0.2% of NIA-16388 | 89 |
| Oil solution containing 0.05% of the compound (3) and 0.05% of Chrysron | 95 |
| Oil solution containing 0.1% of allethrin | 52 |

In the above Table, NIA-16388 is a synergist of N-(4-pentenyl)-phthalimide or O-n-propyl-O-propargylphenyl phosphonate.

Thus, an object of the present invention is to provide a novel intermediate for the production of synthetic pyrethroids.

This object can be accomplished by provision of a novel 5-propargyl thenyl alcohol of the formula (I) and a process for the production thereof, which comprises acetalizing a 5-halomethyl thenaldehyde represented by the formula,

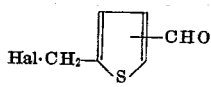

wherein Hal is a halogen atom, to form a 5-halomethyl thenaldehyde acetal represented by the formula,

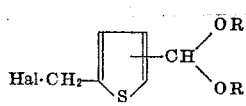

wherein Hal is as defined above and R is a lower alkyl group, or the two R's may be bonded together to form a lower alkylene group, reacting the acetal with a Grignard reagent represented by the formula, $$CH \equiv C - Mg \cdot Hal'$$

wherein Hal' is a halogen atom, to form a 5-propargyl thenaldehyde acetal represented by the formula,

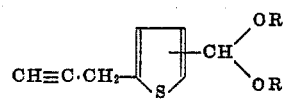

wherein R is as defined above, hydrolyzing the resulting acetal to form a 5-propargyl thenaldehyde represented by the formula,

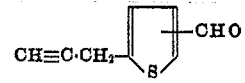

and reducing the resulting aldehyde.

In the above mentioned equation, all the compounds after formula (3), i.e. the 5-halomethyl thenaldehyde acetals (3), the 5-propargyl propargyl thenaldehyde acetals (4), the 5-propargyl thenaldehydes (5), the 5-propargyl thenyl alcohols (I) and the 5-propargyl thenyl halide, are novel compounds unknown from any literature.

The reactions mentioned above are explained in succession below.

The halomethyl thenaldehyde of the formula (2) is obtained by halogenating the 5-hydroxymethyl thenaldehyde (1) with a common halogenating agent such as, for example, thionyl chloride, phosphorus oxychloride, phosphorus trichloride, phosphorus tribromide, hydrogen chloride or hydrogen bromide. When the 5-hydroxymethyl thenaldehyde acetal of the formula (8) is used as a starting material, it is hydrolyzed to obtain the aldehyde (1), which can then be halogenated with concentrated hydrohalic acid, without being isolated but in the form of an aqueous solution.

The 5-halomethylacetal of the formula (3) may be easily obtained by reacting the 5-halomethyl thenaldehyde of the formula (2) with an alcohol and an excess amount of a lower alkyl orthoformate in the presence or absence of an acid catalyst, preferably at below room temperature.

The 5-propargyl thenaldehyde acetal of the formula (4) may be obtained in such a favorable yield as in the case of the furan derivative, which is reported by Ferdinand Bohlmann et al. in Chem. Ber. 98 2602 (1965) by reacting the 5-halomethyl thenaldehyde acetal of the formula (3) with a Grignard reagent having the formula, CH ≡ C·MgHal' wherein Hal' is a halogen, which is prepared according to, for example, the E.R.H. Jones et al.'s method disclosed in J.C.S. 1956, 4765, in the presence of a slight amount of a catalyst such as cuprous chloride and the like.

When this acetal (4) is treated according to an ordinary aldehyde regeneration reaction, i.e. in an aqueous dilute mineral acid solution, or so, the aldehyde of the formula (5) can be obtained quantitatively at room temperature.

The thus obtained aldehyde (5) is subjected to reduction reaction to obtain the objective thenyl alcohol of the formula (6).

As reducing agents, there are frequently used boron hydride compounds such as sodium boron hydride, lithium boron hydride, potassium boron hydride and diborane. As solvents, there may be used water and polar organic solvents such as lower alcohol, dioxane and tetrahydrofuran, either singly or in admixture. The reaction temperature is such a low temperature as below room temperature. The adoption of such a high temperature as above 100°C. is not desirable because there is brought about the reduction of triple bond to double bond. Further, the addition of alkali should strictly be avoided because even such weak alkali as sodium carbonate causes the isomerization of triple bond to allene.

The thenyl alcohol may be easily converted to the halide thereof by the halogenation reaction.

The aldehyde alcohol of the formula (1), for example, 5-hydroxymethl-2-thenaldehyde which is the starting material employed in the above-mentioned process may be obtained, according to the reaction equation set forth below, as disclosed by Ya. L. Goldfarb et al. in C.A. 60 9227.

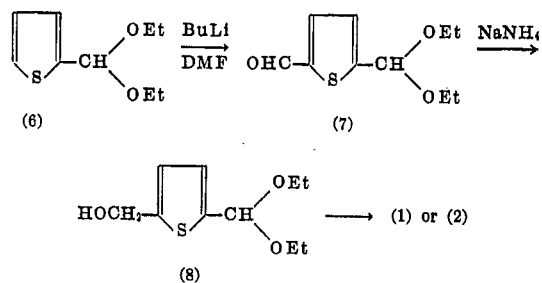

Ya. L. Goldfarb et al. disclose in C.A. 61 629 that the 5-halomethyl thenaldehyde of the formula (2) was synthesized by reacting 2-thenaldehyde with dichlorodimethyl ether in the presence of an aluminum chloride catalyst. This substance, however, is contained in the reaction product in an amount of only 33 percent and has not been isolated.

The present invention will be explained by referring the following Examples, which are, of course, not to limit the scope of the present invention.

EXAMPLE 1

A mixture comprising 107 g. of the 5-hydroxymethyl-2-thenaldehyde acetal (8) and 50 ml. of a 0.1 N aqueous hydrochloric acid solution was stirred at room temperature for several minutes. Into this mixture was dropped with stirring at room temperature 500 ml. of concentrated hydrochloric acid, whereby the liquid came to have a deep red color. Subsequently, the liquid was gradually elevated in temperature and was maintained at 50°C. for 2 hours. During this time, the red color disappeared and a produced tar precipitated as a solid. After cooling, the liquid was charged into ice water, and the solid was filtered off and the filtrate was extracted with carbon tetrachloride. The extract was washed successively with an aqueous sodium bicarbonate solution and a saturated aqueous sodium chloride solution and was then dried over anhydrous sodium sulfate. Thereafter, the solvent was removed by distillation to obtain 51 g. of the 5-chloromethyl-2-thenaldehyde (2) as a transparent pale brown liquid.

I.R. $\nu^{neat}_{max}$ 2,800, 1,676, 1,530, 1,463, 1,046, 814, 766, 706, 670 cm.$^{-1}$

EXAMPLE 2

45.1 g. of the 5-chloromethyl-2-thenaldehyde (2) obtained in Example 1 was mixed at room temperature with 50 g. of methanol and 50 g. of methyl orthoformate, and the mixture was allowed to stand at said temperature for 3 hours. Subsequently, the mixture was poured with stirring into 300 ml. of an aqueous dilute sodium carbonate solution to terminate the reaction. The reaction liquid was extracted with benzene, was washed with a saturated aqueous sodium chloride solution and was then dried over potassium carbonate. Thereafter, the solvent was removed by distillation to obtain the desired 5-chloromethyl thenaldehyde acetal (3), $n^{25}_D$ 1.5250.

I.R. $\nu^{neat}_{max}$ 1,551, 900, 801, 695, 660 cm.$^{-1}$

EXAMPLE 3

An ethyl magnesium bromide solution prepared from 22 g. of magnesium, 93 g. of ethyl bromide and 630 ml. of tetrahydrofuran was dropped into 200 ml. of tetrahydrofuran, while introducing acetylene so as to maintain the system always in an acetylene excess state. The resulting ethynylmagnesium bromide solution was charged with 1 g. of cuprous chloride and then with 55 g. of the acetal (3) obtained in Example 2, and the mixture was refluxed for 2 hours. After removing excess tetrahydrofuran by reduced pressure distillation, the reaction mixture was poured into 500 ml. of a saturated aqueous ammonium chloride solution containing ice, was extracted with hexane, was washed with a saturated aqueous sodium chloride solution and was then dried over anhydrous sodium sulfate. Thereafter, the reaction mixture was freed by distillation from the solvent and was then subjected to distillation to obtain 41 g. of the 5-propargyl-2-thenaldehyde dimethyl acetal (4), b.p. 96°C/0.7 mmHg., $n^{23}_D$ 1.5185.

I.R. $\nu^{neat}_{max}$ 3,285, 1,094, 1,054, 807 cm.$^{-1}$

EXAMPLE 4

To a liquid comprising 100 ml. of methanol and 10 ml. of 0.1 N hydrochloric acid was added at room temperature 33 g. of the acetal (4) obtained in Example 3. After allowing to stand for 30 minutes, the liquid was charged with a sufficient amount of water to deposit an oily substance, was extracted with ether, was washed with a saturated sodium chloride solution and was then dried over anhydrous sodium sulfate. Subsequently, the liquid was freed from the solvent by distillation and was then subjected to distillation to obtain 20 g. of the 5-propargyl-2-thenaldehyde (5), b.p. 67°C/0.06 mmHg, m.p. 29°–31°C., $n^{25}_D$ 1.5873.

I.R. $\nu^{nujol}_{max}$ 3,246, 1,661, 1,530, 1,462, 1,040, 813 cm.$^{-1}$

EXAMPLE 5

To a solution of 19 g. of the aldehyde (5) obtained in Example 4 in 100 ml. of methanol was gradually added, while cooling with ice water, 2 g. of sodium boron hydride. During this time, the temperature was maintained at below 20°C. Subsequently, the mixture was poured into ice water, was extracted with ether, was washed with a saturated aqueous sodium chloride solution, was dried over anhydrous sodium sulfate and was freed from the solvent by distillation. Thereafter, the volatiles were removed by means of a vacuum pump, until no change in weight had been observed, to obtain 18 g. of 5-propargyl-2-thenyl alcohol, $n^{24}{}_D$ 1.5488.
I.R. $\nu^{neat}{}_{max}$ 3,600–3,100, 3,300, 1,550, 1,010, 803 cm.$^{-1}$
What is claimed is:
1. A 5-propargyl thenyl alcohol represented by the formula,
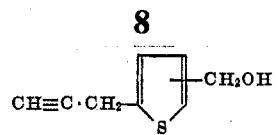
* * * * *